US006749245B1

(12) United States Patent
Walker

(10) Patent No.: US 6,749,245 B1
(45) Date of Patent: Jun. 15, 2004

(54) VEHICLE TAILGATE AND BED ARRANGEMENT

(75) Inventor: Christopher Todd Walker, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/662,318

(22) Filed: Sep. 16, 2003

(51) Int. Cl.⁷ .............................................. B62D 25/00
(52) U.S. Cl. ........................................................ 296/57.1
(58) Field of Search ........................... 296/57.1, 56, 50, 296/146.8, 146.9

(56) References Cited

U.S. PATENT DOCUMENTS

| 1,986,953 A | 1/1935 | Wendel |
| 2,042,911 A | 6/1936 | Stannard |
| 4,763,945 A | 8/1988 | Murray |
| 5,188,415 A | 2/1993 | Wagner |
| 5,664,822 A | 9/1997 | Rosenfield |
| 5,820,189 A | 10/1998 | Tew |
| 5,904,391 A | 5/1999 | Liljenquest et al. |
| 6,293,602 B1 | 9/2001 | Presley |
| 6,334,264 B1 | 1/2002 | Oh |
| 2002/0074818 A1 | 6/2002 | Presley |

*Primary Examiner*—Joseph D. Pape
(74) *Attorney, Agent, or Firm*—Kramer & Amado, P.C.

(57) ABSTRACT

A vehicle tailgate and bed arrangement is disclosed. The tailgate is movable over a range of motion between an open and a closed position. The vehicle bed surface has a rear edge and the tailgate includes a convexly arced surface defining a gap with the rear edge. The convexly arced surface maintains the gap at a substantially constant width along the entire range of motion of the tailgate. The constant gap width prevents any debris from collecting in the gap between the tailgate and the bed.

25 Claims, 5 Drawing Sheets

VEHICLE TAILGATE AND BED ARRANGEMENT

BACKGROUND OF THE INVENTION

1. Field of the Invention

This invention relates generally to a vehicle tailgate and bed arrangement. More particularly, it relates to a tailgate or tailgate cladding having an arc shaped member for maintaining a substantially constant width gap between a vehicle tailgate and bed.

2. Description of Related Art

Vehicles with a tailgate and bed are sometimes used to deliver or haul loose and/or granular material. A problem arises when hauling this type of material. The problem involves a gap that exists between the tailgate and the bed when the tailgate is open. Loose material collects in the gap during loading or unloading when the tailgate is open. The material collected in the gap prevents the tailgate from being closed. The material must them be cleaned from the gap before the tailgate can be shut. If the loose material is rock or other rigid material, the shutting of the tailgate can damage the tailgate, bed or associated hinge assemblies.

There are various solutions in the prior art directed towards solving this problem. The solutions involve covering the gap in some fashion. One solution, for example, covers the gap with a piece of flexible material spanning the gap and attached to both the tailgate and the bed. This solution prevents debris from falling into the gap but causes other problems. If the material is too flexible, it will sag and become stuck in the gap, thus causing the same problem it was meant to alleviate. If the material is too rigid, it will create additional forces and hinder the normal operation of the tailgate. Over time, the material will degrade and may break due to the repeated opening and closing of the tailgate. Additionally, some vehicles include removable tailgates. This solution makes the tailgate unremovable.

A second method for preventing debris from accumulating in the gap involves using an additional flap spanning the gap and hingedly connected to either the tailgate or bed. This does prevent debris from falling into the gap. However, it hinders the working area of the truck bed. It will create a hump that must be traversed when items are removed from and loaded into the bed of the vehicle. Further, the flap creates problems when unloading granular material. The flap is also subject to multiple forces when loading and unloading the vehicle. These forces can easily break or damage the flap. Finally, because the flap is hinged it also has a gap area that may be subject to collecting debris and inhibiting its operation.

The prior art shows various arrangements for preventing debris from accumulating in the gap between a vehicle tailgate and bed. However, the prior art does not show a simple cost effective arrangement for protecting the gap without entirely covering the gap with a secondary piece of material.

SUMMARY OF THE INVENTION

In light of the present need for protecting the gap between a vehicle tailgate and bed and preventing the accumulation of debris within the gap, a brief summary of the present invention is presented. Some simplifications and omission may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow in later sections.

A vehicle tailgate and bed arrangement is disclosed. The tailgate is movable over a range of motion between an open and a closed position. The vehicle bed surface has a rear edge and the tailgate includes a convexly arced surface defining a gap with the rear edge. The convexly arced surface maintains the gap at a substantially constant width along the entire range of motion of the tailgate.

In another embodiment, a vehicle tailgate and bed arrangement is disclosed. The tailgate has a range of motion between an open and a closed position. The vehicle bed surface has a rear edge. A first cladding overlies the tailgate and has a convexly arced surface defining a gap with the rear edge. The convexly arced surface maintains the gap at a substantially constant width along the entire range of motion of the tailgate.

In another embodiment, a vehicle tailgate and bed arrangement is disclosed. The tailgate is movable over a range of motion between an open and a closed position. The vehicle bed surface has a rear edge and the tailgate includes a convexly arced surface defining a gap with the rear edge. The convexly arced surface maintains the gap at a substantially constant width along the entire range of motion of the tailgate. The gap defines the top opening of a debris clearance area, which also includes a bottom opening for ejecting debris from the debris clearance area.

In yet another embodiment, a vehicle having a bed and a tailgate with a hinge member for swingably mounting the tailgate to the vehicle about an axis of rotation for movement between an open and a closed position is disclosed. It includes a first cladding covering at least a portion of the tailgate. The first cladding includes an arced surface. It also includes a second cladding covering at least a portion of the bed and having a rear edge. The arced portion is located between the axis of rotation and the rear edge of the vehicle bed and maintains a substantially constant distance away from the rear edge of the second cladding as the tailgate is moved between the open and closed positions.

BRIEF DESCRIPTION OF THE DRAWINGS

In order to better understand the present invention, reference is made to the accompanying drawings, wherein.

DETAILED DESCRIPTION OF THE PREFERRED EMBODIMENTS OF THE INVENTION

Figure 1:
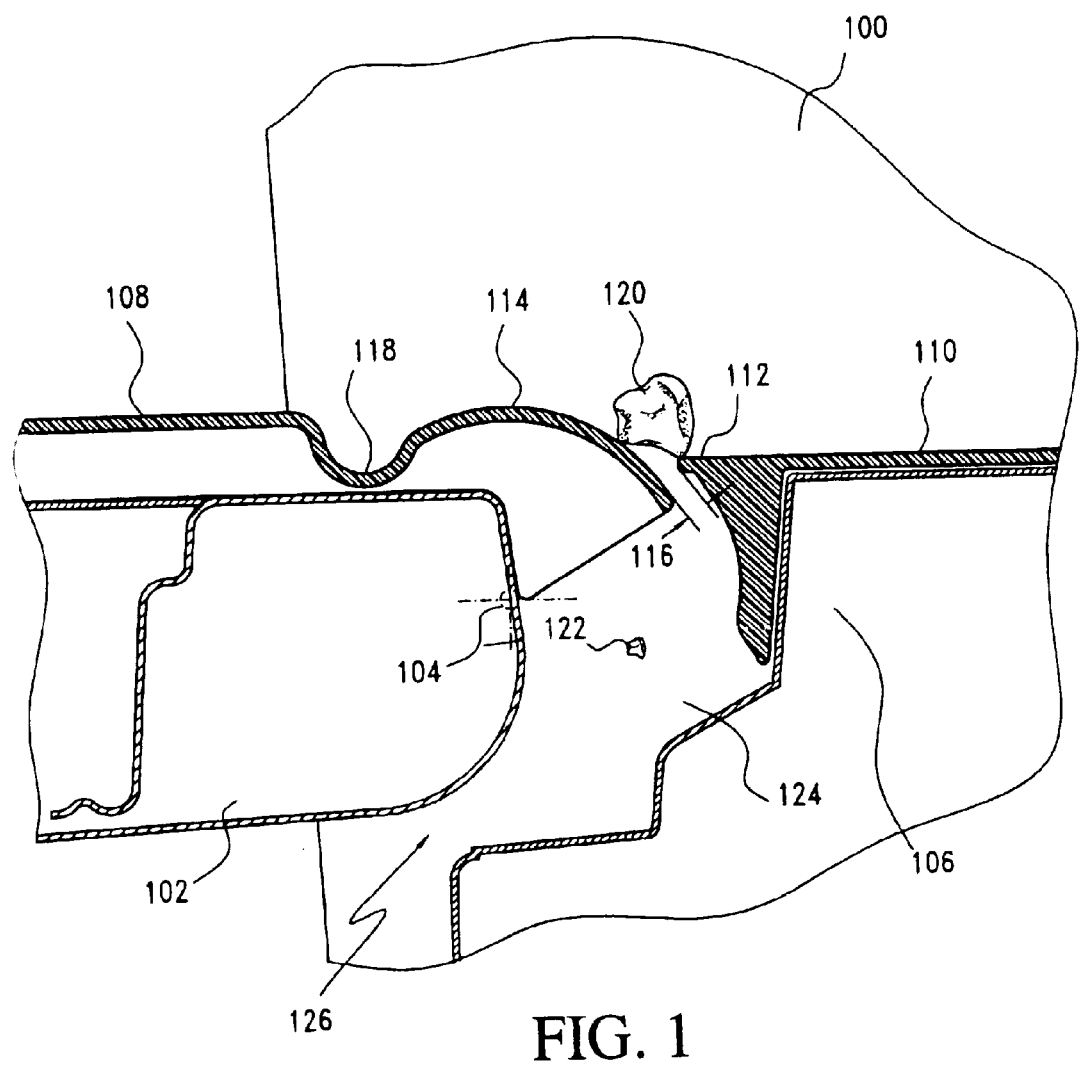
FIG. 1 shows an embodiment of the invention with an open debris clearance area.

Referring now to the drawings, in which like numerals refer to like components or steps, there are disclosed broad aspects of the embodiments of the present invention. FIG. 1 shows an arrangement 100, which includes a tailgate 102 hingedly connected to the end of the vehicle bed 106 about a hinge point 104. A hinge (not shown) allows for movement of the tailgate 102 about an axis of rotation between an open and closed position. Also shown in FIG. 1 is a first cladding 108 covering or partially covering the tailgate 102 and a second cladding 110 covering or partially covering the vehicle bed 106. The first cladding 108 includes a convexly arced portion 114 and an indented portion 118. The second cladding 110 includes a rear edge 112. The convexly arced portion 114 and rear edge 112 define a gap 116. The width of the gap 116 of the present invention remains substantially constant as the tailgate 102 is moved between an open and closed position.

The cladding system or liner system as shown can be implemented as an aftermarket system installed after the production of the vehicle. The cladding system can also be installed during production of the vehicle. In this case, the cladding system could be removable or permanently installed.

Because the gap 116 is of a substantially constant width, debris 120 larger than the gap 116 will remain on the surfaces of the claddings 108 and 110 and will not fall into the gap 116. Debris 122 smaller than the gap 116 will fall through a debris clearance area 124 located between the tailgate 102 and the vehicle bed 106.

The debris clearance area 124 is defined by the area below the gap 116, between the tailgate 102 and the vehicle bed 106. The gap 116 defines the top opening of the debris clearance area 124. The bottom opening 126, in this embodiment, is substantially larger than the gap 116 when the vehicle is in the closed or open position. Therefore, debris that has fallen through the gap 116 continues through the bottom opening 126.

Because the debris clearance area 124 is larger than the gap 116, the debris 122 will fall through and not hinder the closing of the tailgate 102. This condition is further insured by positioning the gap 116 between the load bearing surfaces of the claddings 108 and 110. The load bearing surfaces are the top of the claddings 108 and 110 that are exposed to loads. The gap 116 defines an entry point into the debris clearance area 124 between the tailgate 102 and bed 106.

The convexly arced surface 114 is shaped so that the width of the gap 116 remains substantially constant throughout the entire range of motion of the tailgate 102. In the present embodiment, the distance between the hinge point 104 and the rear edge 112 remains constant. Therefore, the convexly arced surface 114 is a partial circle defined by a substantially constant radius with respect to the hinge point 104. The width of the gap 116 can be chosen to be any particular size. In the present embodiment, the width is 5 millimeters.

Figure 2:
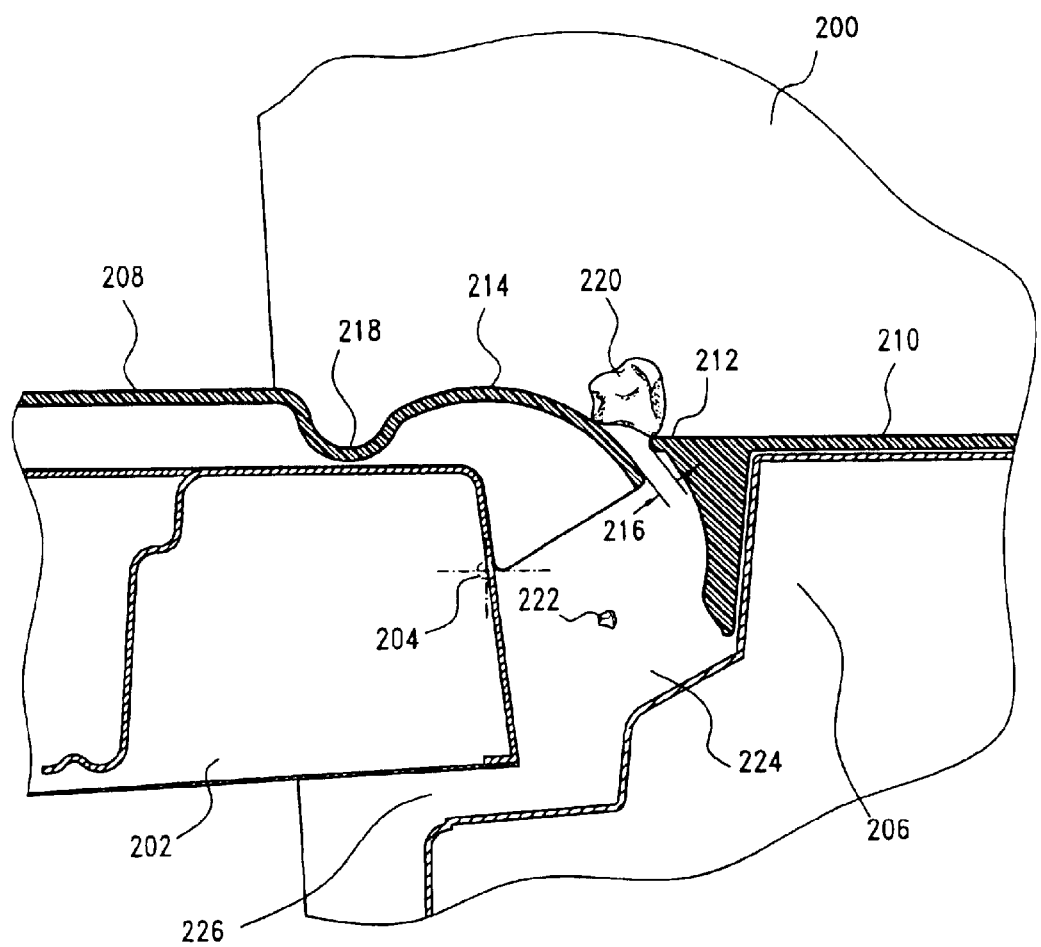
FIG. 2 shows an embodiment of the invention with the tailgate in the open position.

FIG. 2 shows an arrangement 200 including a tailgate 202 hingedly connected to the end of the vehicle bed 206 about a hinge point 204. A hinge (not shown) allows for movement of the tailgate 202 about an axis of rotation between an open and closed position. Also shown in FIG. 2 is a first cladding 208 covering or partially covering the tailgate 202 and a second cladding 210 covering or partially covering the vehicle bed 206. The first cladding 208 includes a convexly arced portion 214 and an indented portion 218. The second cladding 210 includes a rear edge 212. The convexly arced portion 214 and rear edge 212 define a gap 216. The width of the gap 216 of the present invention remains substantially constant as the tailgate 202 is moved between an open and closed position.

Because the gap 216 is of a substantially constant width, debris 220 larger than the gap 216 will remain on the surfaces of the claddings 208 and 210 and will not fall into the gap 216. Debris 222 smaller than the gap 216 will fall through a debris clearance area 224 located between the tailgate 202 and the vehicle bed 206.

The debris clearance area 224 is defined by the area below the gap 216, between the tailgate 202 and the vehicle bed 206. The gap 216 defines the top opening of the debris clearance area 224. The bottom opening 226, in this embodiment, is slightly larger than the gap 216. Debris that has fallen through the gap 216 either continues through the bottom opening 226 or stays in the gap clearance area 224 when the tailgate 202 is in the open position. However, the bottom opening 226 becomes substantially larger than the gap 216 when the tailgate 202 is shut. See FIG. 3. This acts as an ejection mechanism removing any debris that may have fallen into the debris clearance area 224.

Because the debris clearance area 224 is larger than the gap 216, the debris 222 will fall through and not hinder the closing of the tailgate 202. This condition is further insured by positioning the gap 216 between the load bearing surfaces of the claddings 208 and 210. The load bearing surfaces are the top of the claddings 208 and 210 that are exposed to loads. The gap 216 defines an entry point into the debris clearance area 224 between the tailgate 202 and bed 206.

The convexly arced surface 214 is shaped so that the width of the gap 216 remains substantially constant throughout the entire range of motion of the tailgate 202. In the present embodiment, the distance between the hinge point 204 and the rear edge 212 remains constant. Therefore, the convexly arced surface 214 is a partial circle defined by a substantially constant radius with respect to the hinge point 204. The width of the gap 216 can be chosen to be any particular size. In the present embodiment, the width is 5 millimeters.

Figure 3:
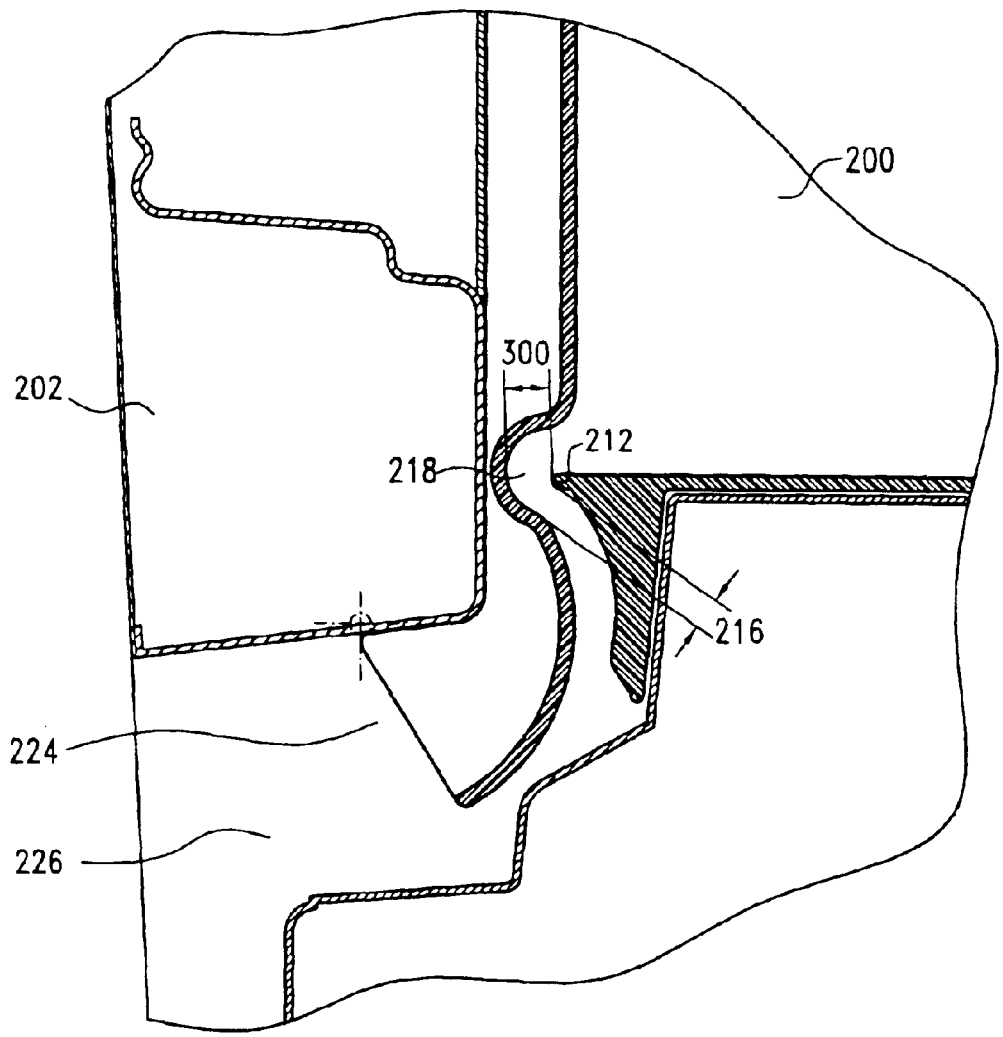
FIG. 3 shows an embodiment of the invention with the tailgate in the closed position.

Referring to FIG. 3, the arrangement 200 is shown with the tailgate 202 in the closed position. In this figure, the rear edge 212 fits partially into the indented portion 218. The distance 300 between the indented portion 218 and the rear edge 212 is slightly larger than the gap 216 width. This provides a buffer allowing the tailgate 202 to close notwithstanding any debris 220 that may be abutting the gap 216 when the tailgate 202 is shut. Debris 222 that has fallen into the debris clearance area 224 is expelled by closing the tailgate 202.

Figure 4:
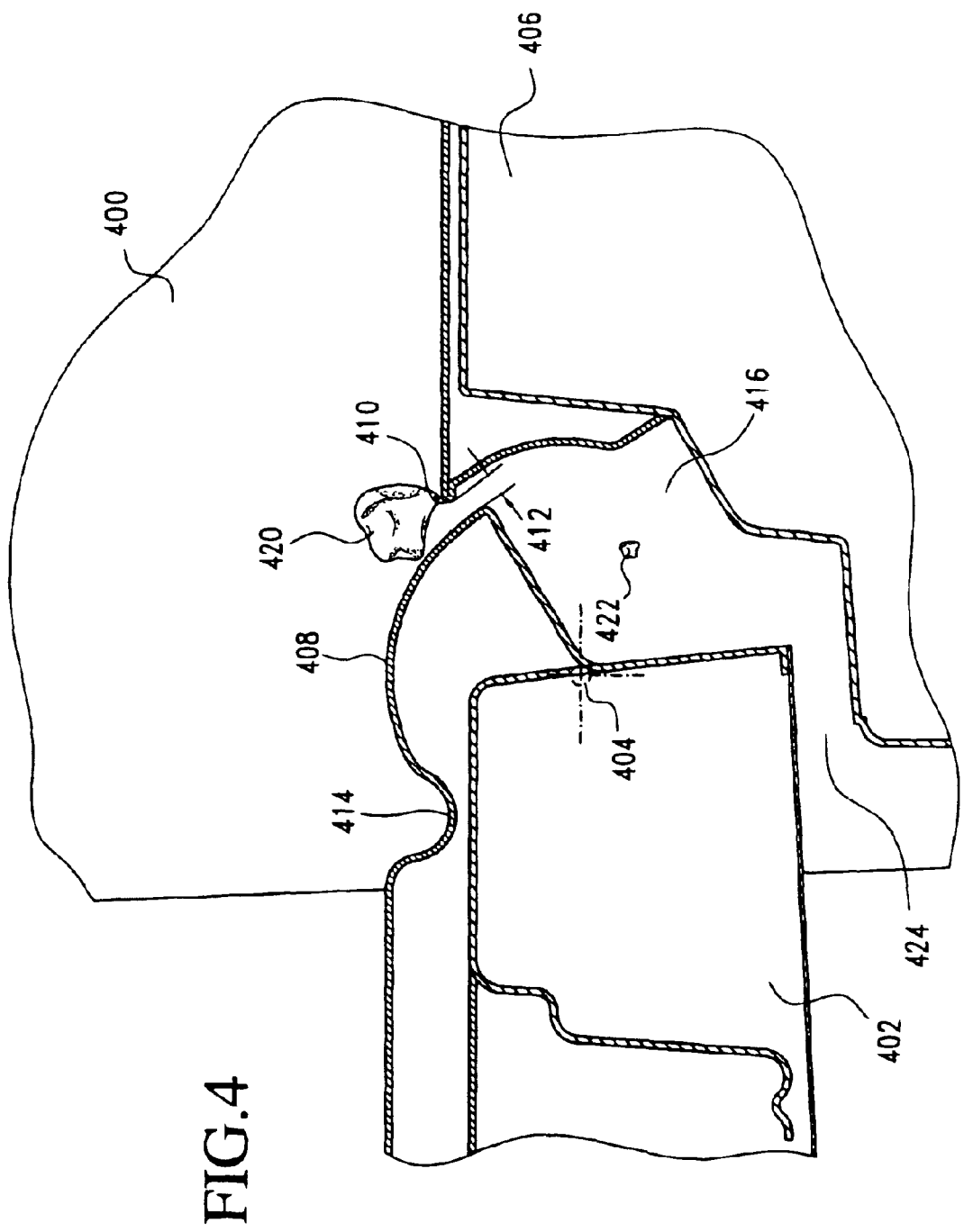
FIG. 4 shows another embodiment of the invention with the tailgate in the open position.

FIG. 4 shows a second embodiment of the present invention. In this embodiment, the invention is integrated into the tailgate and bed itself, as opposed to an aftermarket cladding or vehicle bed lining that is sold to a consumer for installing on a conventional tailgate and bed arrangement. The cladding of the previous embodiments can also be installed by the manufacturer as a permanent or removable addition to a vehicle tailgate and bed arrangement. Referring again to FIG. 4, a vehicle tailgate and bed arrangement 400 is shown. The arrangement includes a tailgate 402 hingedly connected to the end of the vehicle bed 406 about a hinge point 404. A hinge (not shown) allows for movement of the tailgate 402 about an axis of rotation between an open and closed position. The tailgate 402 includes a convexly arced portion 408 and an indented portion 414. The bed 406 includes a rear edge 410. The convexly arced portion 408 and rear edge 410 define a gap 412. The gap 412 remains substantially constant as the tailgate 402 is moved between an open and closed position.

Because the gap 412 is of a substantially constant width, debris 420 larger than the gap 412 will remain on the surfaces of the tailgate 402 and bed 406 and will not fall into the gap 412. Debris 422 smaller than the gap 412 will fall through a debris clearance area 416 located between the tailgate 402 and the vehicle bed 406.

The debris clearance area 416 is defined by the area below the gap 412 and between the tailgate 402 and the vehicle bed 406. The gap 412 defines the top opening of the debris clearance area 416. The bottom opening 424, in this embodiment, is slightly larger than the gap 412. Debris 422 that has fallen through the gap 412 either continues through the bottom opening 424 or stays in the debris clearance area 416 when the tailgate 402 is in the closed position. However, the bottom opening 424 becomes substantially larger than the gap 412 when the tailgate 402 is shut. See FIG. 5. This acts as an ejection mechanism removing any debris that may have fallen into the debris clearance area 416.

Because the debris clearance area 416 is larger than the gap 412, the debris 422 will fall through and not hinder the closing of the tailgate 402. This condition is further insured by positioning the gap 412 between the load bearing surfaces of the tailgate 402 and bed 406. The load bearing surfaces are the working surfaces of the tailgate 402 and bed 406 that are exposed to loads. The gap 412 defines an entry point into the debris clearance area 416 between the tailgate 402 and bed 406.

The convexly arced surface 408 is shaped so that the width of the gap 412 remains substantially constant throughout the entire range of motion of the tailgate 402. In the present embodiment, the distance between the hinge point 404 and the rear edge 410 remains constant. Therefore, the convexly arced surface 408 is a partial circle defined by a substantially constant radius with respect to the hinge point 404. The width of the gap 412 can be chosen to be any particular size. In the present embodiment, the width is 5 millimeters.

Figure 5:
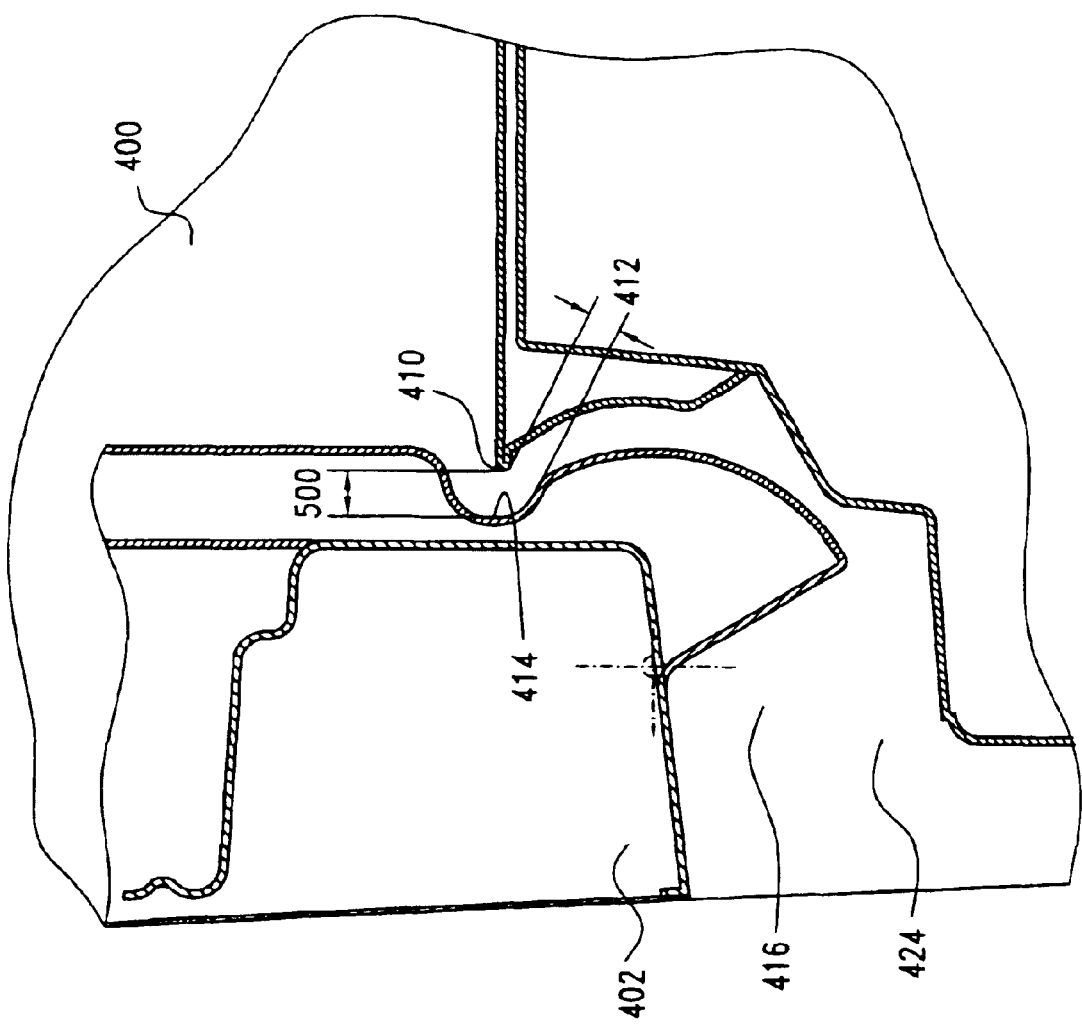
FIG. 5 shows another embodiment of the invention with the tailgate in the closed position.

Referring to FIG. 5, the arrangement 400 is shown with the tailgate 402 in the closed position. In this figure, the rear edge 410 fits partially into the indented portion 414. The distance 500 between the indented portion 414 and the rear edge 410 is slightly larger than the gap 412 width. This provides a buffer allowing the tailgate 402 to close notwithstanding any debris 420 that may be abutting the gap 412 when the tailgate 402 is shut.

Although the present invention has been described in detail with particular reference to present embodiments thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A vehicle tailgate and bed arrangement, the tailgate having a range of motion between an open and a closed position, comprising:
   a vehicle bed surface having a rear edge;
   a convexly arced tailgate surface defining a gap with the rear edge; and wherein the convexly arced tailgate surface maintains the gap at a substantially constant width along the entire range of motion of the tailgate.

2. The vehicle tailgate and bed arrangement of claim 1, further including an indented portion in the tailgate adjacent and parallel to the convexly arced surface.

3. The vehicle tailgate and bed arrangement of claim 2, wherein the rear edge extends slightly into the indented portion of the tailgate when the tailgate is in the closed position.

4. The vehicle tailgate and bed arrangement of claim 3, wherein the distance between the rear edge and the indented portion is greater than the gap width when the tailgate is in the closed position.

5. The vehicle tailgate and bed arrangement of claim 1, further including a first cladding at least partially covering the tailgate surface and wherein the convexly arced tailgate surface is defined by the cladding.

6. The vehicle tailgate and bed arrangement of claim 5, further including a second cladding at least partially covering the vehicle bed and wherein the rear edge is defined by the second cladding.

7. The vehicle tailgate and bed arrangement of claim 6, further including an indented portion in the first cladding adjacent and parallel to the convexly arced surface.

8. The vehicle tailgate and bed arrangement of claim 7, wherein the rear edge extends slightly into the indented portion when the tailgate is in the closed position.

9. A vehicle tailgate and bed arrangement, the tailgate having a range of motion between an open and a closed position, comprising:
   a vehicle bed surface having a rear edge;
   a debris clearance area having a top opening and a bottom opening;
   a convexly arced tailgate surface defining a gap with the rear edge; and
   wherein the gap defines the top opening of the debris clearance area and the convexly arced tailgate surface maintains the gap at a substantially constant width along the entire range of motion of the tailgate.

10. The vehicle tailgate and bed arrangement of claim 9, wherein the bottom opening is slightly larger than the gap when the tailgate is in the open position.

11. The vehicle tailgate and bed arrangement of claim 10, wherein the bottom opening is substantially larger than the gap when the tailgate is in the closed position.

12. The vehicle tailgate and bed arrangement of claim 11, wherein the debris clearance area ejects debris when the tailgate is moved from the open to the closed position.

13. The vehicle tailgate and bed arrangement of claim 9, wherein the bottom opening is substantially larger than the gap when the tailgate is in the open and closed positions.

14. The vehicle tailgate and bed arrangement of claim 9, further including a first cladding at least partially covering the tailgate surface and wherein the convexly arced tailgate surface is defined by the cladding.

15. The vehicle tailgate and bed arrangement of claim 14, further including a second cladding at least partially covering the vehicle bed and wherein the rear edge is defined by the second cladding.

16. The vehicle tailgate and bed arrangement of claim 15, further including an indented portion in the first cladding adjacent and parallel to the convexly arced surface.

17. The vehicle tailgate and bed arrangement of claim 16, wherein the rear edge extends slightly into the indented portion when the tailgate is in the closed position.

18. The vehicle tailgate and bed arrangement of claim 9, further including an indented portion in the tailgate adjacent and parallel to the convexly arced surface.

19. The vehicle tailgate and bed arrangement of claim 18, wherein the rear edge extends slightly into the indented portion of the tailgate when the tailgate is in the closed position.

20. A vehicle having a bed and a tailgate swingably mounted to the vehicle about an axis of rotation for movement between an open and a closed position, comprising:
   a first cladding covering at least a portion of the tailgate, the first cladding having an arced surface;

a second cladding covering at least a portion of the bed and having a rear edge; and wherein the arced surface is located between the axis of rotation and the rear edge of the vehicle bed and maintains a substantially constant distance away from the rear edge of the second cladding as the tailgate is moved between the open and closed positions.

21. A cladding system for a vehicle tailgate and bed arrangement, the tailgate having a range of motion between an open and a closed position, comprising:

a first part covering at least a portion of the bed and having a rear edge;

a second part covering at least a portion of the tailgate, the second part having a convexly arced surface and defining a gap with the rear edge;

and wherein the convexly arced surface maintains the gap at a substantially constant width along the entire range of motion of the tailgate.

22. The cladding system of claim 21, further including an indented portion in the second part adjacent and parallel to the convexly arced surface.

23. The cladding system of claim 22, wherein the rear edge extends slightly into the indented portion of the second part when the tailgate is in the closed position.

24. The cladding system of claim 23, wherein the distance between the rear edge and the indented portion is greater than the gap width when the tailgate is in the closed position.

25. A cladding system for a vehicle having a bed and a tailgate swingably mounted to the vehicle about an axis of rotation for movement between an open and a closed position, comprising:

a first part covering at least a portion of the tailgate, the first part having a convexly arced surface;

a second part covering at least a portion of the bed and having a rear edge; and wherein the arced surface is located between the axis of rotation and the rear edge of the vehicle bed and maintains a substantially constant distance away from the rear edge of the second part as the tailgate is moved between the open and closed positions.

\* \* \* \* \*